(12) United States Patent
Hosseini et al.

(10) Patent No.: US 10,931,484 B2
(45) Date of Patent: Feb. 23, 2021

(54) TRANSMIT POWER AND FREQUENCY HOPPING CONFIGURATIONS FOR CONTROL INFORMATION TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 181 days.

(21) Appl. No.: 15/988,144

(22) Filed: May 24, 2018

(65) Prior Publication Data

US 2018/0343148 A1    Nov. 29, 2018

Related U.S. Application Data

(60) Provisional application No. 62/511,921, filed on May 26, 2017.

(51) Int. Cl.
*H04L 25/02* (2006.01)
*H04W 52/14* (2009.01)
(Continued)

(52) U.S. Cl.
CPC ........ *H04L 25/0226* (2013.01); *H04L 5/0048* (2013.01); *H04W 52/146* (2013.01);
(Continued)

(58) Field of Classification Search
CPC ........... H04W 72/0446; H04W 52/325; H04W 52/146; H04W 52/18; H04W 72/042;
(Continued)

(56) References Cited

U.S. PATENT DOCUMENTS 9,749,970 B2    8/2017   Vajapeyam et al.
9,826,540 B1    11/2017  Li et al.
(Continued)

FOREIGN PATENT DOCUMENTS

WO    WO-2016040290 A1    3/2016
WO    WO-2017078786 A1    5/2017
(Continued)

OTHER PUBLICATIONS

Huawei et al., "Discussion on CA Issues for Shortened TTI Operation", 3GPP Draft; R1-1707032, 3rd Generation Partnership Project (3gpp), Mobile Competence Centre; 650, Route Des Lucioles; F-06921 Sophia-Antipol, vol. RAN WG1, No. Hangzhou, China; May 15, 2017-May 19, 2017 May 14, 2017, XP051272262, Retrieved from the Internet: URL:http://www.3gpp.org/ftp/Meetings_3GPP_SYNC/RAN1/Docs/[retrieved on May 14, 2017], 4 pages.

(Continued)

*Primary Examiner* — Yemane Mesfin
*Assistant Examiner* — Mon Cheri S Davenport
(74) *Attorney, Agent, or Firm* — Holland & Hart LLP

(57) ABSTRACT

Methods, systems, and devices for wireless communication are described. Some wireless communications systems may support communication between a base station and a user equipment (UE) during transmission time intervals (TTIs) having different lengths. The techniques described herein allow a UE to utilize appropriate configurations for communicating during a shortened TTI (sTTI) allocated for uplink communication (e.g., uplink control information transmissions). In one example, the UE may adjust a transmit power to use for transmitting uplink control information during an sTTI based on the length of the sTTI or based on the number of symbols allocated for transmitting the uplink control information in the sTTI. In another example, the UE may determine a frequency hopping pattern to use for
(Continued)

transmitting uplink control information during an sTTI based on whether a portion of the sTTI is allocated for another transmission (e.g., a sounding reference signal (SRS) transmission).

44 Claims, 10 Drawing Sheets

(51) Int. Cl.
    *H04W 52/34*    (2009.01)
    *H04W 52/32*    (2009.01)
    *H04W 52/18*    (2009.01)
    *H04L 5/00*    (2006.01)
    *H04W 72/04*    (2009.01)
    *H04L 27/26*    (2006.01)

(52) U.S. Cl.
    CPC ......... *H04W 52/18* (2013.01); *H04W 52/325* (2013.01); *H04W 52/346* (2013.01); *H04W 72/0413* (2013.01); *H04W 72/0473* (2013.01); *H04L 5/001* (2013.01); *H04L 5/003* (2013.01); *H04L 5/005* (2013.01); *H04L 5/0044* (2013.01); *H04L 5/0051* (2013.01); *H04L 5/0053* (2013.01); *H04L 27/2613* (2013.01)

(58) Field of Classification Search
    CPC ............. H04W 72/1273; H04W 52/06; H04W 52/346; H04W 72/04; H04L 25/0226
See application file for complete search history.

(56) References Cited

U.S. PATENT DOCUMENTS

| | | | |
|---|---|---|---|
| 10,511,351 B2* | 12/2019 | Zhang | H04L 5/0007 |
| 2016/0095104 A1* | 3/2016 | Chen | H04L 1/0007 370/329 |
| 2017/0064706 A1 | 3/2017 | Patel et al. | |
| 2017/0273071 A1 | 9/2017 | Nogami et al. | |
| 2019/0116611 A1* | 4/2019 | Lee | H04W 72/1278 |
| 2019/0215775 A1* | 7/2019 | Almquist | H04W 52/08 |

FOREIGN PATENT DOCUMENTS

| | | |
|---|---|---|
| WO | WO 2017172535 A1 | 10/2017 |
| WO | WO 2017196250 A1 | 11/2017 |

OTHER PUBLICATIONS

LG Electronics: "Discussion on UCI Transmission on sPUSCH", 3GPP Draft; R1-1704832 UCI on SPUSCH, 3rd Generation Partnership Project (3gpp), Mobile Competence Centre; 650, Route Des Lucioles; F-06921 Sophia-Antipol, vol. RAN WG1, No. Spokane, USA; Apr. 3, 2017- Apr. 7, 2017 Apr. 2, 2017, XP051242968, Retrieved from the Internet: URL:http://www.3gpp.org/ftp/Meetings_3GPP_SYNC/RAN1/Docs/ [retrieved on Apr. 2, 2017], 5 pages.
Partial International Search Report—PCT/US2018/034732—ISA/EPO—dated Aug. 24, 2018.
International Search Report and Written Opinion—PCT/US2018/034732—ISA/EPO—dated Oct. 29, 2018.

* cited by examiner

TRANSMIT POWER AND FREQUENCY HOPPING CONFIGURATIONS FOR CONTROL INFORMATION TRANSMISSIONS

CROSS REFERENCES

The present Application for Patent claims the benefit of U.S. Provisional Patent Application No. 62/511,921 by Hosseini et al., entitled "Transmit Power and Frequency Hopping Configurations For Control Information Transmissions," filed May 26, 2017, assigned to the assignee hereof, and expressly incorporated by reference herein in its entirety.

BACKGROUND

The following relates generally to wireless communication and more specifically to transmit power and frequency hopping configurations for control information transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In some wireless communications systems, a base station and a UE may communicate during transmission time intervals (TTIs) having different lengths. For example, a base station and a UE may communicate during shortened TTIs (sTTIs) spanning two symbols and sTTIs spanning three symbols. In such examples, it may be challenging for a base station to configure a UE for efficient communication on these resources.

SUMMARY

Some wireless communications systems may support communication between a base station and a user equipment (UE) during transmission time intervals (TTIs) having different lengths. The techniques described herein allow a UE to utilize appropriate configurations for communicating during a shortened TTI (sTTI) of a particular length allocated for uplink communication (e.g., uplink control information transmissions). In one example, the UE may adjust a transmit power to use for transmitting uplink control information during an sTTI based on the length of the sTTI or based on a number of symbols allocated for a control channel in the sTTI. In another example, the UE may determine a frequency hopping pattern to use for transmitting uplink control information during an sTTI based on whether a portion of the sTTI is allocated for another transmission (e.g., a sounding reference signal (SRS) transmission).

A method for wireless communication in a system that supports multiple TTI lengths is described. The method may include identifying a control region of a TTI allocated for uplink communication, determining a length of the TTI allocated for uplink communication, adjusting a transmit power for transmitting uplink control information in the control region of the TTI based at least in part on the length of the TTI, and transmitting the uplink control information in the control region of the TTI using the adjusted transmit power.

An apparatus for wireless communication in a system that supports multiple TTI lengths is described. The apparatus may include means for identifying a control region of a TTI allocated for uplink communication, means for determining a length of the TTI allocated for uplink communication, means for adjusting a transmit power for transmitting uplink control information in the control region of the TTI based at least in part on the length of the TTI, and means for transmitting the uplink control information in the control region of the TTI using the adjusted transmit power.

Another apparatus for wireless communication in a system that supports multiple TTI lengths is described. The apparatus may include a processor, memory in electronic communication with the processor, and instructions stored in the memory. The instructions may be operable to cause the processor to identify a control region of a TTI allocated for uplink communication, determine a length of the TTI allocated for uplink communication, adjust a transmit power for transmitting uplink control information in the control region of the TTI based at least in part on the length of the TTI, and transmit the uplink control information in the control region of the TTI using the adjusted transmit power.

A non-transitory computer readable medium for wireless communication in a system that supports multiple TTI lengths is described. The non-transitory computer-readable medium may include instructions operable to cause a processor to identify a control region of a TTI allocated for uplink communication, determine a length of the TTI allocated for uplink communication, adjust a transmit power for transmitting uplink control information in the control region of the TTI based at least in part on the length of the TTI, and transmit the uplink control information in the control region of the TTI using the adjusted transmit power.

In some examples of the method, apparatus, and non-transitory computer-readable medium described above, adjusting the transmit power includes using a same transmit power for transmitting uplink control information during each symbol of the TTI. In some examples of the method, apparatus, and non-transitory computer-readable medium described above, the TTI includes three (3) symbols. In some examples of the method, apparatus, and non-transitory computer-readable medium described above, the adjusted transmit power includes a same transmit power used for transmitting uplink control information during a TTI including two symbols.

Some examples of the method, apparatus, and non-transitory computer-readable medium described above may further include processes, features, means, or instructions for determining that one symbol of the TTI may be allocated for an SRS transmission. Some examples of the method, apparatus, and non-transitory computer-readable medium described above may further include processes, features, means, or instructions for using a first transmit power for transmitting the uplink control information during a first symbol of the TTI and using a second transmit power for transmitting the uplink control information during a second symbol of the TTI, where the first transmit power and the second transmit power are the same (e.g., each of the first transmit power and the second transmit power includes one half (½) of the adjusted transmit power for transmitting the uplink control information during the TTI).

Some examples of the method, apparatus, and non-transitory computer-readable medium described above may further include processes, features, means, or instructions for receiving an indication of the transmit power for transmitting uplink control information during each symbol of the TTI, where the first transmit power and the second transmit power may be adjusted based at least in part on the indication. In some examples of the method, apparatus, and non-transitory computer-readable medium described above, the indication includes a power offset parameter.

Some examples of the method, apparatus, and non-transitory computer-readable medium described above may further include processes, features, means, or instructions for determining that none of the symbols of the TTI may be allocated for an SRS transmission. Some examples of the method, apparatus, and non-transitory computer-readable medium described above may further include processes, features, means, or instructions for using a first transmit power for transmitting the uplink control information during a first symbol of the TTI, using a second transmit power for transmitting the uplink control information during a second symbol of the TTI, and using a third transmit power for transmitting the uplink control information during a third symbol of the TTI, where each of the first transmit power, the second transmit power, and the third transmit power includes a fraction (e.g., one third (⅓) when the transmit power in each symbol is given by dividing the adjusted transmit power by the number of symbols) of the adjusted transmit power for transmitting the uplink control information during the TTI.

Some examples of the method, apparatus, and non-transitory computer-readable medium described above may further include processes, features, means, or instructions for receiving an indication of the transmit power for transmitting uplink control information during each symbol of the TTI, where the first transmit power, the second transmit power, and the third transmit power may be adjusted based at least in part on the indication. In some examples of the method, apparatus, and non-transitory computer-readable medium described above, the indication includes a power offset parameter.

In some examples of the method, apparatus, and non-transitory computer-readable medium described above, the control region spans one symbol of the TTI. In some examples of the method, apparatus, and non-transitory computer-readable medium described above, the adjusted transmit power may be a same transmit power used for transmitting uplink control information during each symbol of a TTI including two symbols. In some examples of the method, apparatus, and non-transitory computer-readable medium described above, the adjusted transmit power may be greater than a transmit power used for transmitting uplink control information during each symbol of a TTI including two symbols.

Some examples of the method, apparatus, and non-transitory computer-readable medium described above may further include processes, features, means, or instructions for receiving an indication of the transmit power for transmitting uplink control information during the TTI, where the transmit power may be adjusted based at least in part on the indication. In some examples of the method, apparatus, and non-transitory computer-readable medium described above, the indication includes a power offset parameter. In some examples of the method, apparatus, and non-transitory computer-readable medium described above, the length of the TTI allocated for uplink communication may be determined based at least in part on an index of the TTI or a type of service associated with the TTI.

A method for wireless communication is described. The method may include identifying a control region of a TTI allocated for uplink communication, identifying a frequency hopping pattern for transmitting uplink control information in the control region of the TTI based at least in part on whether a portion of the TTI is allocated for an SRS transmission, and transmitting the uplink control information in the control region of the TTI based at least in part on the identified frequency hopping pattern.

An apparatus for wireless communication is described. The apparatus may include means for identifying a control region of a TTI allocated for uplink communication, means for identifying a frequency hopping pattern for transmitting uplink control information in the control region of the TTI based at least in part on whether a portion of the TTI is allocated for a SRS transmission, and means for transmitting the uplink control information in the control region of the TTI based at least in part on the identified frequency hopping pattern.

Another apparatus for wireless communication is described. The apparatus may include a processor, memory in electronic communication with the processor, and instructions stored in the memory. The instructions may be operable to cause the processor to identify a control region of a TTI allocated for uplink communication, identify a frequency hopping pattern for transmitting uplink control information in the control region of the TTI based at least in part on whether a portion of the TTI is allocated for a SRS transmission, and transmit the uplink control information in the control region of the TTI based at least in part on the identified frequency hopping pattern.

A non-transitory computer readable medium for wireless communication is described. The non-transitory computer-readable medium may include instructions operable to cause a processor to identify a control region of a TTI allocated for uplink communication, identify a frequency hopping pattern for transmitting uplink control information in the control region of the TTI based at least in part on whether a portion of the TTI is allocated for a SRS transmission, and transmit the uplink control information in the control region of the TTI based at least in part on the identified frequency hopping pattern.

In some examples of the method, apparatus, and non-transitory computer-readable medium described above, one symbol of the TTI may be allocated for the SRS transmission and the TTI includes three (3) symbols. In some examples of the method, apparatus, and non-transitory computer-readable medium described above, transmitting the uplink control information based at least in part on the identified frequency hopping pattern includes transmitting uplink control information on a first frequency region of a system bandwidth during a first symbol of the TTI and transmitting uplink control information on a second frequency region of the system bandwidth during a second symbol of the TTI.

DETAILED DESCRIPTION

Figure 1:
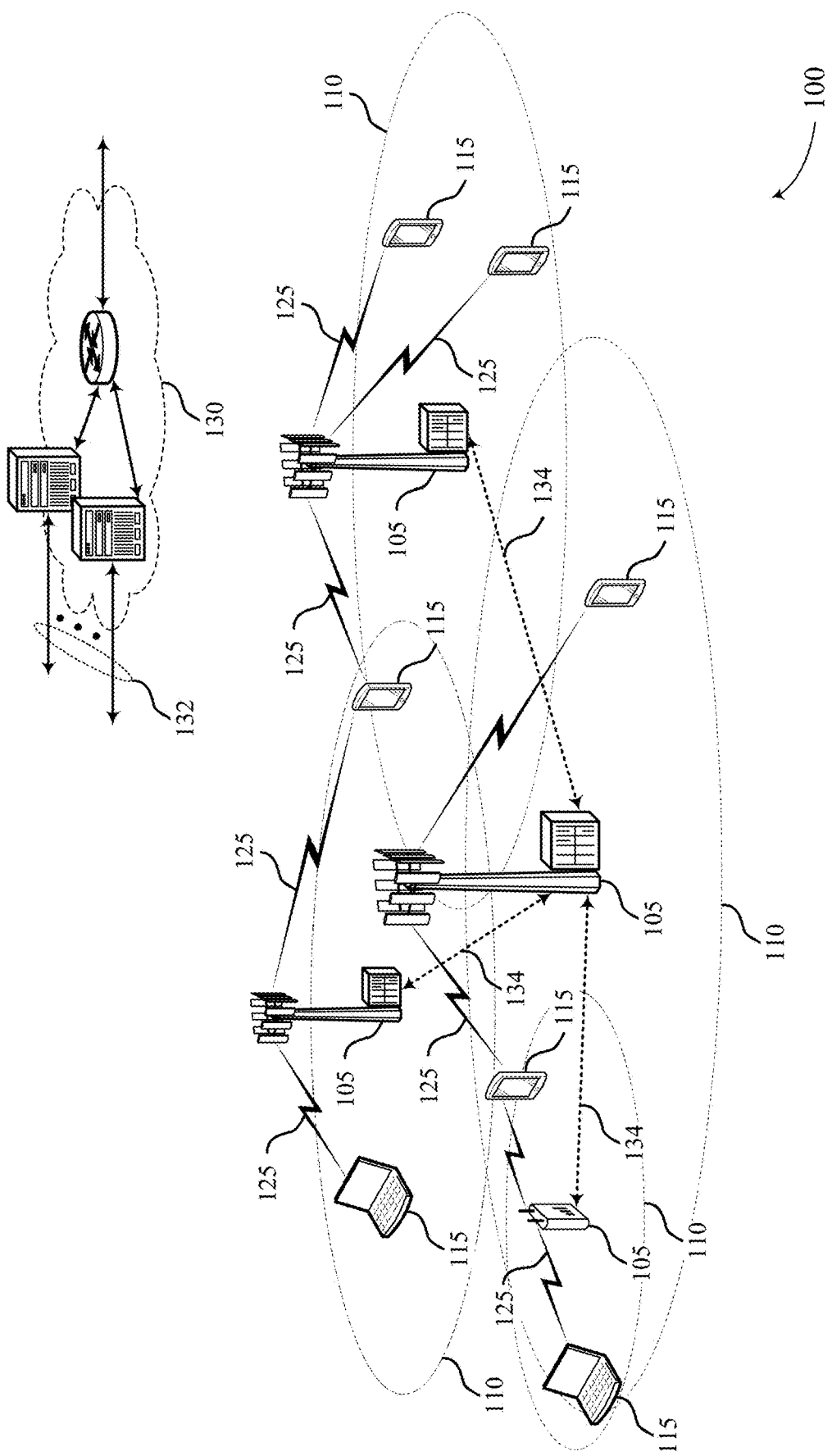
FIGS. 1 and 2 illustrate examples of wireless communications systems in accordance with aspects of the present disclosure.

Wireless communications systems described herein support efficient techniques for configuring a user equipment (UE) to communicate on a set of resources based on the structure of the resources or based on whether a portion of the resources is allocated for another transmission (e.g., a sounding reference signal (SRS) transmission).

Some wireless communications systems may support communication between a base station and a UE during transmission time intervals (TTIs) (or shortened TTIs (sTTIs)) with different lengths. For example, in one instance, a UE may be scheduled to transmit uplink control information during an sTTI with one length, and, in another instance, the UE may be scheduled to transmit uplink control information during an sTTI with a different length. In some systems, a UE may transmit uplink control information in TTIs with different lengths using the same transmit power configuration. Further, the UE may utilize the same transmit power configuration to transmit uplink control information during an sTTI regardless of whether a portion of the TTI is allocated for another transmission (e.g., an SRS transmission).

In some aspects, however, if the UE is configured to use a same transmit power configuration for transmitting uplink control information in TTIs having different lengths, the UE may transmit the uplink control information using an insufficient amount of power or using excessive power. Similarly, if the UE is configured to use a same transmit power configuration for transmitting uplink control information in a TTI regardless of whether a portion of the TTI is allocated for another transmission, the UE may transmit the uplink control information using an insufficient amount of power or using excessive power. In such aspects, it may be challenging for a base station to decode uplink control information received from a UE if the UE fails to use sufficient power to transmit the uplink control information. Alternatively, the use of an excessive amount of power for an uplink control information transmission may be detrimental to the battery life of the UE.

Additionally, in some cases, a UE may use the same frequency hopping configuration for an uplink control information transmission during an sTTI regardless of whether a portion of the sTTI is allocated for another transmission, and this may result in inefficiencies in a wireless communications system. For example, if a UE is configured to use the same frequency hopping configuration for transmitting uplink control information during a three symbol sTTI regardless of whether a symbol in the sTTI is allocated for an SRS transmission, the UE may transmit on the same frequency region of a system bandwidth in the two remaining symbols (i.e., the symbols not used for the SRS transmission). That is, the UE may not transmit on different frequency regions during the two remaining symbols (i.e., no frequency hopping). As such, the uplink control information transmission may have a lower signal-to-interference-plus-noise ratio (SINR) due to the lack of diversity in the uplink transmission, and, as a result, there may be a lower chance that the uplink control information transmission is received.

As described herein, a wireless communications system may support efficient techniques for configuring a UE to transmit uplink control information on a set of resources based on the structure of the resources and whether a portion of the resources is allocated for another transmission. In one aspect, the UE may determine a transmit power configuration to transmit uplink control information during an sTTI based on a length of the sTTI and, in some examples, based on whether a portion of the sTTI is allocated for another transmission. In another aspect, the UE may determine a frequency hopping pattern for transmitting the uplink control information during an sTTI based on whether a portion of the sTTI is allocated for another transmission.

Aspects of the disclosure introduced above are described below in the context of a wireless communications system. Examples of processes and signaling exchanges that support transmit power and frequency hopping configurations for control information transmissions are then described. Aspects of the disclosure are further illustrated by and described with reference to apparatus diagrams, system diagrams, and flowcharts that relate to transmit power and frequency hopping configurations for control information transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a 5th Generation (5G)/New Radio (NR) or long term evolution (LTE) (or LTE-Advanced (LTE-A)) network. In some aspects, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or gNBs 105.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. A symbol described herein may correspond to an orthogonal frequency division multiplexing (OFDM) symbol, a single-carrier frequency division multiplexing (SC-FDM) symbol, a Discrete Fourier Transform-spread-OFDM (DFT-s-OFDM) symbol, etc.

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE systems or NR systems), a subframe may be the basic unit of scheduling or TTI. In other aspects, such as with low latency operation, a different, reduced-duration TTI (e.g., an sTTI) may be used (e.g., a mini-slot). Wireless communications system 100 may employ various TTI durations, including those that facilitate low latency and mobile broadband (MBB) communications, in addition to other types of communication associated with LTE and NR.

In some examples, a subframe may include six sTTIs with the first and last sTTIs in the subframe spanning three symbols and the other sTTIs spanning two symbols. Accordingly, the number of symbols spanned by a shortened physical uplink shared channel (sPUSCH) or a shortened physical uplink control channel (sPUCCH) may be based on the length of an sTTI. In one example, an sPUCCH format with a sequence based sPUCCH without demodulation reference signals (DMRSs) may be supported for up to two HARQ bits (i.e., a low payload size) in a two symbol sTTI and a three symbol sTTI. In this example, because there may be no DMRSs in an sTTI, all symbols of the sTTI may be used for an sPUCCH transmission. Further, in this example, a UE 115 may be configured to use frequency hopping for transmissions of uplink control information on the sPUCCH.

In another example, different sPUCCH formats may be supported for larger payload sizes (e.g., more than two bits). In either example, the number of symbols spanned by the sPUCCH in an sTTI may depend on the index of the sTTI or a type of service (e.g., low latency service) for which the sTTI is allocated. That is, the number of symbols spanned by the sPUCCH in an sTTI may depend on or correspond to the number of symbols in the sTTI.

A resource element may consist of one symbol period and one subcarrier (e.g., a 15 kHz frequency range). In some aspects, the numerology employed within a system (i.e., symbol size, subcarrier size, or TTI duration) may be selected or determined based on a type of communication. The numerology may be selected or determined in view of an inherent tradeoff between latency for low latency applications and efficiency for other applications, for example. Accordingly, the duration of time slots allocated for MBB communications may be greater than the duration of time slots allocated for low latency communications (e.g., mini-slots). Similarly, as mentioned above, the duration of time slots allocated for low latency communications (e.g., three symbol sTTIs) may be greater than the duration of other time slots allocated for low latency communications (e.g., two symbol sTTIs). In some aspects, however, a UE 115 may operate using a same configuration (e.g., transmit power configuration) regardless of the duration of a TTI, and this may be detrimental to a wireless communications system.

Further, in wireless communications system 100, a UE 115 may be configured by a base station 105 to transmit SRSs to the base station 105. The SRSs may allow the base station 105 to perform channel estimation such that the base station 105 may be able to efficiently allocate resources to the UE 115 for uplink transmissions. In some examples, a base station 105 may schedule an SRS transmission during the last symbol of a subframe (or the last symbol of a last sTTI in the subframe). In some aspects, however, a UE 115 may be configured to operate using the same configurations regardless of whether this symbol is allocated for an SRS transmission, and this may result in inefficiencies in a wireless communications system.

Wireless communications system 100 may support efficient techniques for configuring a UE 115 for uplink communication based on the resources allocated for uplink communication. In one example, a base station 105 may configure a UE 115 with an appropriate uplink transmit power for an uplink transmission based on the length of an sTTI allocated for the uplink transmission. Accordingly, the UE may be able to transmit uplink signals (e.g., uplink control information) reliably by utilizing sufficient power for the uplink transmission while avoiding the use of excessive power for the transmission. In another example, a base station 105 may configure a UE 115 with a frequency hopping pattern for an uplink transmission to allow for a more diverse uplink transmission. The frequency hopping pattern may depend on whether a symbol in an sTTI allocated for the uplink transmission is allocated for another transmission.

Figure 2:
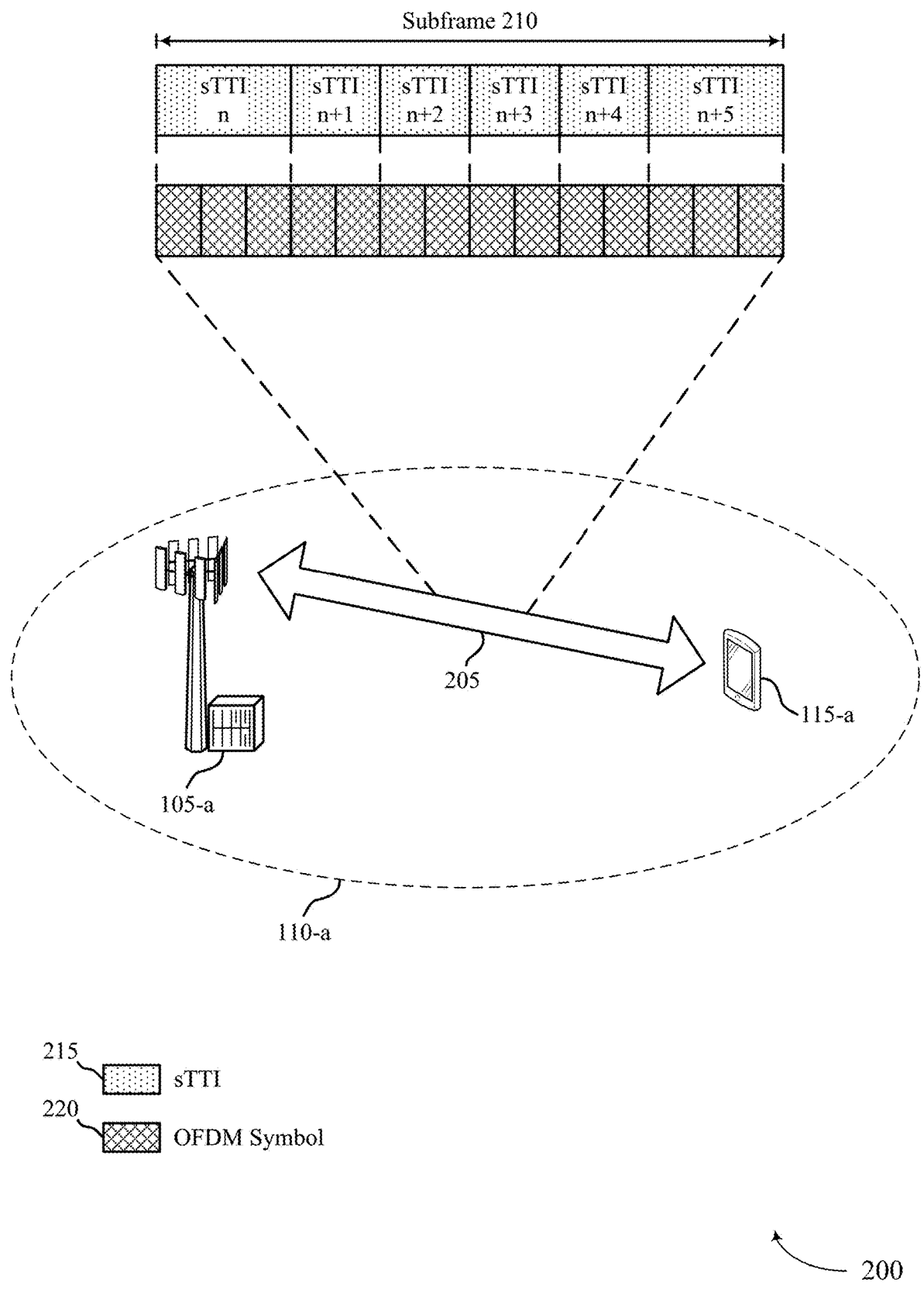

FIG. 2 illustrates an example of a wireless communications system 200 in accordance with various aspects of the present disclosure. Wireless communications system 200 may implement aspects of wireless communications system 100. Wireless communications system 200 includes base station 105-a and UE 115-a, which may be examples of corresponding devices described with reference to FIG. 1. Base station 105-a may be in communication with one or more UEs 115 within geographic coverage area 110-a. For example, base station 105-*a* may be in communication with UE 115-*a* on resources of a carrier 205.

In some aspects, base station 105-*a* may configure UE 115-*a* to transmit uplink control information on resources of carrier 205. For example, base station 105-*a* may configure UE 115-*a* to transmit uplink control information during sTTIs 215 of a subframe 210, where each sTTI 215 spans a number of symbols 220. As described with reference to FIG. 1, subframe 210 may include six sTTIs 215 with two of the sTTIs 215 spanning three symbols 220 and the remaining four sTTIs 215 spanning two symbols 220. As described herein, wireless communications system 200 may support efficient techniques for configuring UE 115-*a* appropriately for transmitting the uplink control information during each sTTI 215 based on a structure of the sTTI 215 and whether symbols 220 within the sTTI 215 are allocated for other transmissions (e.g., SRS transmissions). That is, UE 115-*a* may determine a transmit power configuration for an uplink control information transmission based on the length of an sTTI allocated for the uplink control information transmission or based on a number of symbols allocated for the uplink control information transmission.

In the example of FIG. 2, base station 105-*a* may provide an appropriate transmit power configuration for UE 115-*a* to use to transmit uplink control information to base station 105-*a*. Specifically, UE 115-*a* may be configured to determine a transmit power for an uplink transmission of control information based on a length of an sTTI allocated for the uplink transmission (e.g., which may be based on a type of service for which the sTTI is allocated or based on the index of the sTTI). In one example, UE 115-*a* may determine a transmit power to use to transmit the control information in each symbol of an sTTI. That is, the UE 115-*a* may use the same transmit power to transmit control information in each symbol of an sTTI regardless of the length of the sTTI. Correspondingly, the UE 115-*a* may use more power to transmit control information in a three symbol sTTI than a two symbol sTTI. However, if one symbol of a three symbol sTTI is allocated for an SRS transmission, the UE 115-*a* may use the same amount of power to transmit control information in the three symbol sTTI as the two symbol sTTI.

In another example, UE 115-*a* may determine a transmit power to use to transmit the control information in the sTTI. In some examples, the UE 115-*a* may be configured to use the same transmit power for uplink transmissions of control information in a two symbol sTTI and a three symbol sTTI. Thus, if one symbol of a three symbol sTTI is allocated for an SRS transmission, the UE 115-*a* may use the same amount of power to transmit the control information in each symbol of the three symbol sTTI and each symbol of the two symbol sTTI. However, if none of the symbols of a three symbol sTTI are allocated for an SRS transmission, the UE 115-*a* may use less power to transmit the control information in each symbol of the three symbol sTTI when compared to the power used to transmit control information in each symbol of a two symbol sTTI. In such examples, the energy per bit of the uplink transmission in a three-symbol sTTI may be the same as the energy per bit of a similar uplink transmission in a two symbol sTTI (i.e., when the same number of bits are transmitted in the two-symbol sTTI and the three symbol sTTI).

In some cases, a base station 105-*a* may signal different power offset parameters depending on whether a symbol in an sTTI is allocated for an SRS transmission. Specifically, the base station 105-*a* may transmit a first power offset parameter if none of the symbols of the sTTI are allocated for an SRS transmission, where the first power offset parameter indicates a transmit power for the UE 115-*a* to use to transmit the control information in each symbol of the sTTI. And the base station 105-*a* may transmit a second power offset parameter if one symbol of the sTTI is allocated for an SRS transmission, where the second power offset parameter indicates a different transmit power for the UE 115-*a* to use to transmit the control information in each symbol of the sTTI.

The examples described above provide techniques for determining an appropriate transmit power for uplink transmissions of control information in a three symbol sPUCCH of a three symbol sTTI. However, in other aspects (e.g., for low latency services), a UE 115-*a* may be scheduled to transmit control information in a one symbol sPUCCH of an sTTI. Accordingly, in one example, the UE 115-*a* may transmit control information in a one symbol sPUCCH using the same transmit power used to transmit control information in each symbol of a two symbol sPUCCH. In another example, the UE 115-*a* may boost the transmit power used to transmit control information in a one symbol sPUCCH as compared to the transmit power used to transmit control information in each symbol of a two symbol sPUCCH. In such aspects, base station 105-*a* may transmit a separate power offset parameter to configure a UE 115-*a* with a transmit power to use to transmit control information in a one symbol sPUCCH (i.e., separate from a power offset parameter used to configure the UE 115-*a* to transmit control information in sPUCCHs spanning more than one symbol).

Figure 3:
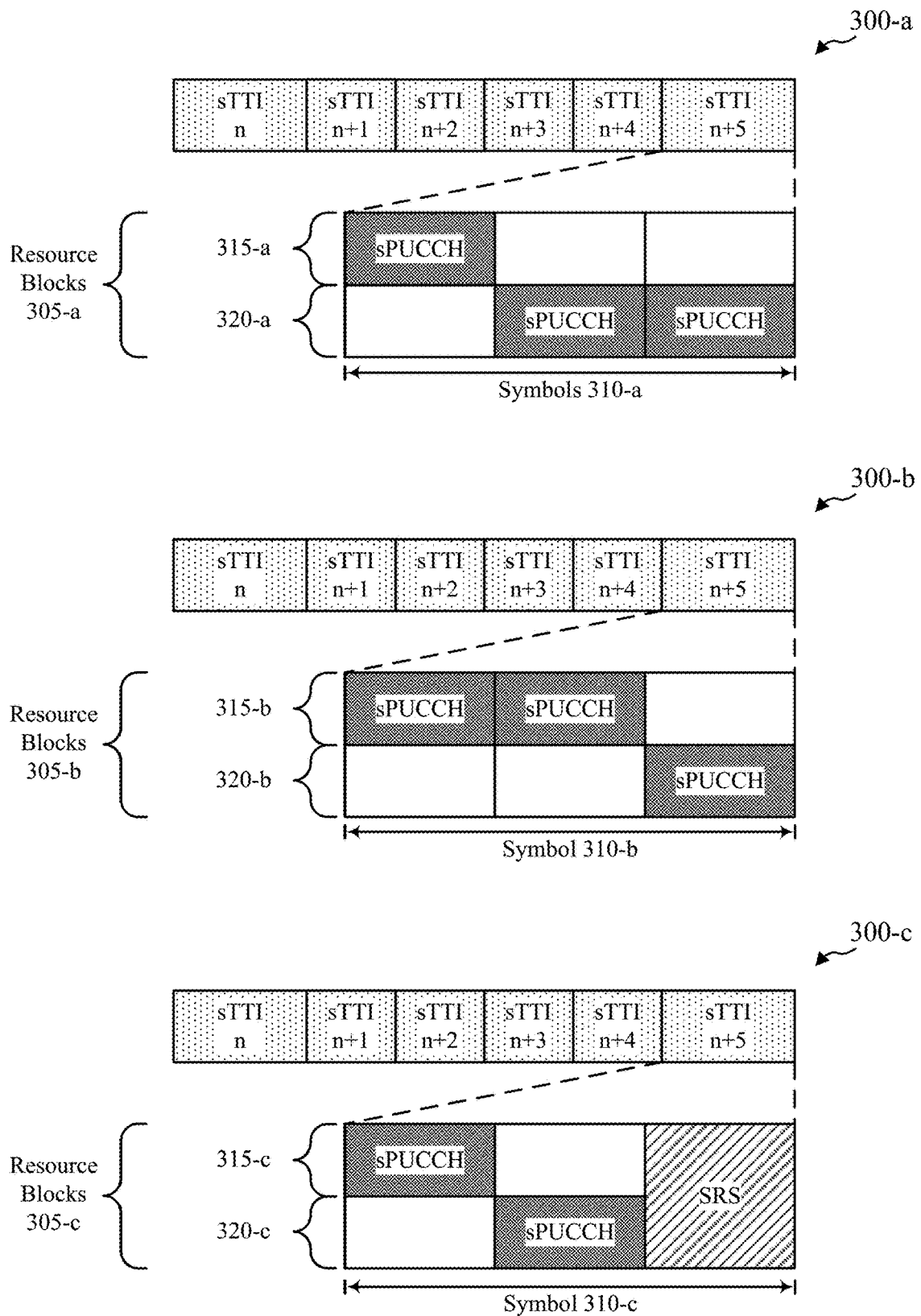
FIG. 3 illustrates examples of multiple uplink transmissions using different frequency hopping configurations in accordance with aspects of the present disclosure.

FIG. 3 illustrates examples of multiple uplink transmissions 300 using different frequency hopping patterns in accordance with various aspects of the present disclosure. In the examples shown, a UE 115 transmits uplink control information during the last sTTI of a subframe (i.e., sTTI n+5) on multiple resources blocks 305. As illustrated, sTTI n+5 contains three symbols 310 and is thus referred to as a three symbol sTTI. In the example of FIG. 3, a UE 115 is provided with different frequency hopping configurations based on whether a symbol in the three symbol sTTI is allocated for an SRS transmission. That is, the UE 115 may identify a frequency hopping pattern for transmitting uplink control information based on whether a symbol of the sTTI is allocated for an SRS transmission.

In uplink transmission 300-*a*, a UE 115 transmits uplink control information in an sPUCCH that spans all three symbols 310-*a* of the sTTI according to a first frequency hopping pattern. In this example, the UE 115 transmits control information on a first frequency region 315-*a* of a system bandwidth during a first symbol. Subsequently, the UE 115 transmits control information on a second frequency region 320-*a* of a system bandwidth during a second symbol and a third symbol. Since the UE 115 transmits on one frequency region in the first symbol and on another frequency region in the second and third symbols, the frequency hopping pattern is {1, 2}.

In uplink transmission 300-*b*, a UE 115 transmits uplink control information in an sPUCCH that spans all three symbols 310-*b* of the sTTI according to a second frequency hopping pattern. In this example, the UE 115 transmits control information on a first frequency region 315-*b* of a system bandwidth during a first symbol and a second symbol. Subsequently, the UE 115 transmits control information on a second frequency region 320-*b* of a system bandwidth during a third symbol. Since the UE 115 transmits on one frequency region in the first and second symbols and on another frequency region in the third symbol, the frequency hopping pattern is {2, 1}.

In uplink transmission 300-c, a UE 115 transmits uplink control information in an sPUCCH that spans two symbols 310-c of the sTTI, since the last symbol of the sTTI is allocated for an SRS transmission. As described herein, UE 115 may determine that the last symbol of the sTTI is allocated for the SRS transmission, and the UE 115 may identify a frequency hopping pattern based on the last symbol of the sTTI being allocated for the SRS transmission. As such, the UE 115 transmits control information on a first frequency region 315-c of a system bandwidth during a first symbol and on a second frequency region 320-c of a system bandwidth during a second symbol. Since the UE 115 transmits on one frequency region in the first symbol and on another frequency region in the second symbol, the frequency hopping pattern is {1, 1}. In some cases, the {1, 1} frequency hopping pattern may correspond to a {1, 2} frequency hopping pattern, where the last symbol of the sTTI is not used for the uplink transmission.

Figure 4:
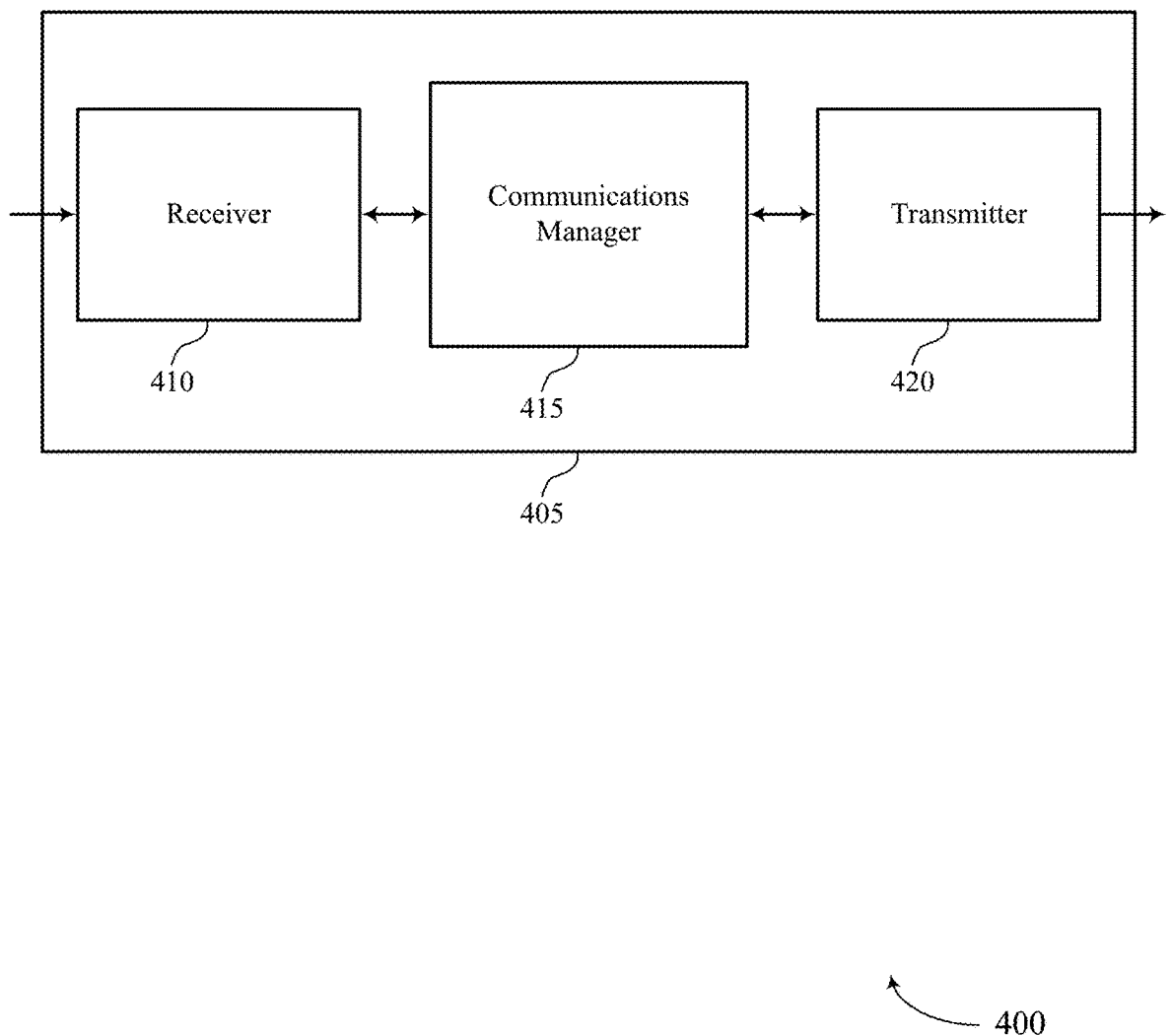
FIGS. 4 and 5 show block diagrams of a device in accordance with aspects of the present disclosure.

FIG. 4 shows a block diagram 400 of a wireless device 405 in accordance with various aspects of the present disclosure. Wireless device 405 may be an example of aspects of a UE 115 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to transmit power and frequency hopping configurations for control information transmissions, etc.). Information may be passed on to other components of the device. The receiver 410 may be an example of aspects of the transceiver 635 described with reference to FIG. 6. The receiver 410 may utilize a single antenna or a set of antennas.

Communications manager 415 may be an example of aspects of the communications manager 615 described with reference to FIG. 6. Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may identify a control region of a TTI allocated for uplink communication, determine a length of the TTI allocated for uplink communication, and adjust a transmit power for transmitting uplink control information in the control region of the TTI based on the length of the TTI. The communications manager 415 may also identify a control region of a TTI allocated for uplink communication, identify a frequency hopping pattern for transmitting uplink control information in the control region of the TTI based on whether a portion of the TTI is allocated for an SRS transmission, and transmit the uplink control information in the control region of the TTI based on the identified frequency hopping pattern.

Transmitter 420 may transmit signals generated by other components of the device. In some examples, the transmitter 420 may be collocated with a receiver 410 in a transceiver module. For example, the transmitter 420 may be an example of aspects of the transceiver 635 described with reference to FIG. 6. The transmitter 420 may utilize a single antenna or a set of antennas. In some examples, transmitter 420 may transmit the uplink control information in the control region of the TTI using the adjusted transmit power.

Figure 5:
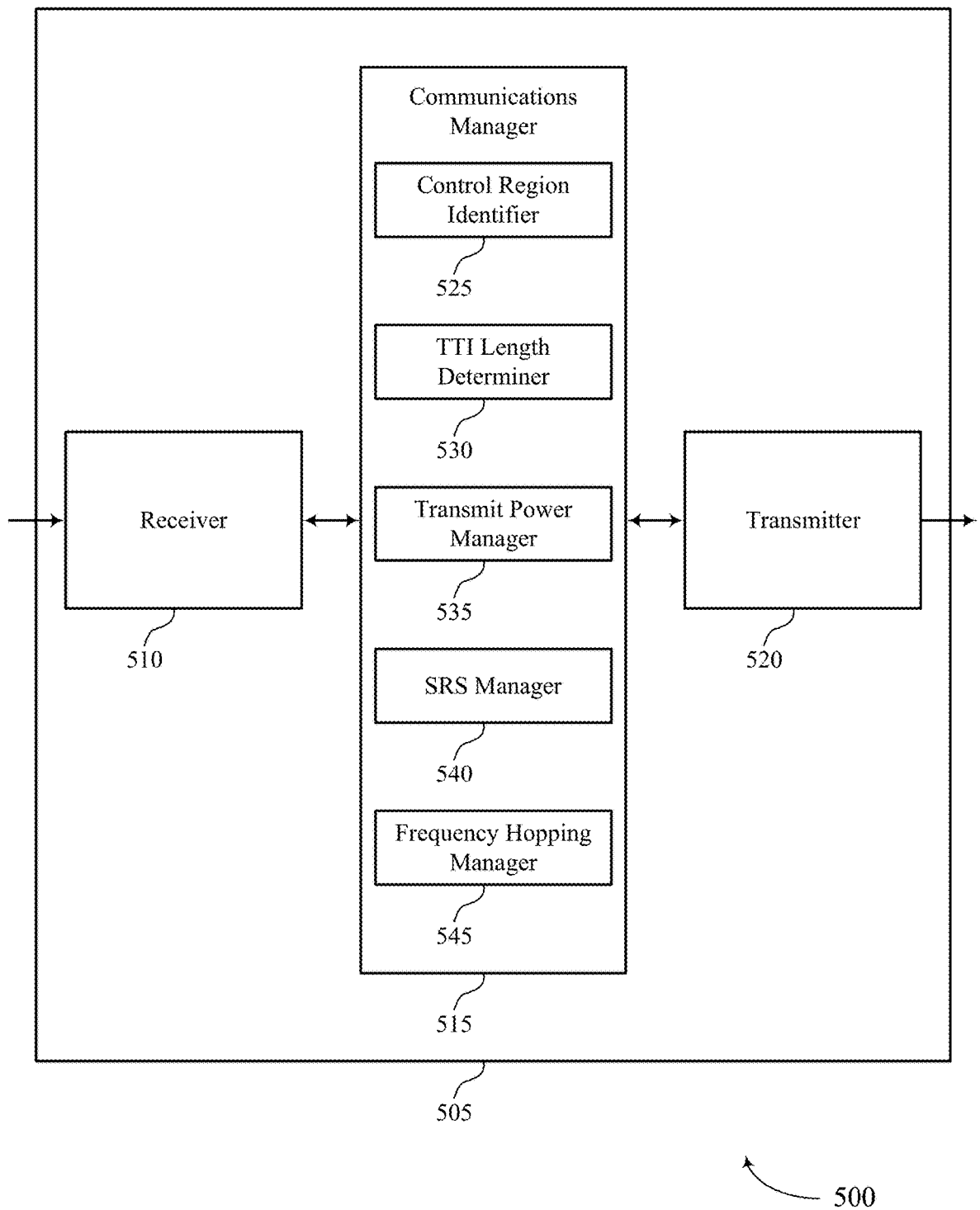

FIG. 5 shows a block diagram 500 of a wireless device 505 in accordance with various aspects of the present disclosure. Wireless device 505 may be an example of aspects of a wireless device 405 or a UE 115 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmit power and frequency hopping configurations for control information transmissions, etc.). Information may be passed on to other components of the device. The receiver 510 may be an example of aspects of the transceiver 635 described with reference to FIG. 6. The receiver 510 may utilize a single antenna or a set of antennas.

Communications manager 515 may be an example of aspects of the communications manager 615 described with reference to FIG. 6. Communications manager 515 may include control region identifier 525, TTI length determiner 530, transmit power manager 535, SRS manager 540, and frequency hopping manager 545.

Control region identifier 525 may identify a control region of a TTI allocated for uplink communication. In some aspects, the TTI includes three (3) symbols. In some aspects, the control region spans one symbol of the TTI. In some aspects, the length of the TTI allocated for uplink communication is determined based on an index of the TTI or a type of service associated with the TTI. TTI length determiner 530 may determine a length of the TTI allocated for uplink communication.

Transmit power manager 535 may adjust a transmit power for transmitting uplink control information in the control region of the TTI based on the length of the TTI. In some aspects, transmit power manager 535 may use a first transmit power for transmitting the uplink control information during a first symbol of the TTI and use a second transmit power for transmitting the uplink control information during a second symbol of the TTI, where the first transmit power and the second transmit power are the same. In some aspects, transmit power manager 535 may receive an indication of the transmit power for transmitting uplink control information during each symbol of the TTI, where the first transmit power and the second transmit power are adjusted based on the indication. In some aspects, the indication includes a power offset parameter.

In some aspects, transmit power manager 535 may use a first transmit power for transmitting the uplink control information during a first symbol of the TTI, use a second transmit power for transmitting the uplink control information during a second symbol of the TTI, and use a third transmit power for transmitting the uplink control information during a third symbol of the TTI, where each of the first transmit power, the second transmit power, and the third transmit power includes a fraction (e.g., one third (⅓)) of the adjusted transmit power for transmitting the uplink control information during the TTI. In some aspects, transmit power manager 535 may receive an indication of the transmit power for transmitting uplink control information during each symbol of the TTI, where the first transmit power, the second transmit power, and the third transmit power are adjusted based on the indication. In some aspects, the indication includes a power offset parameter.

In some aspects, the adjusted transmit power includes a same transmit power used for transmitting uplink control information during a TTI including two symbols. In some aspects, adjusting the transmit power includes using a same transmit power for transmitting uplink control information during each symbol of the TTI. In some aspects, the adjusted transmit power is a same transmit power used for transmitting uplink control information during each symbol of a TTI including two symbols. In some aspects, the adjusted transmit power is greater than a transmit power used for transmitting uplink control information during each symbol of a TTI including two symbols. In some aspects, transmit power manager 535 may receive an indication of the transmit power for transmitting uplink control information during the TTI, where the transmit power is adjusted based on the indication. In some aspects, the indication includes a power offset parameter.

SRS manager 540 may determine that one symbol of the TTI is allocated for a SRS transmission or determine that none of the symbols of the TTI are allocated for a SRS transmission. In some aspects, SRS manager 540 may determine whether a portion of the TTI is allocated for a SRS transmission. In some aspects, one symbol of the TTI is allocated for the SRS transmission and the TTI includes three (3) symbols.

Frequency hopping manager 545 may identify a frequency hopping pattern for transmitting uplink control information in the control region of the TTI based on whether a portion of the TTI is allocated for an SRS transmission. In some aspects, frequency hopping manager 545 may transmit the uplink control information in the control region of the TTI based on the identified frequency hopping pattern. In some aspects, transmitting the uplink control information based on the identified frequency hopping pattern includes transmitting uplink control information on a first frequency region of a system bandwidth during a first symbol of the TTI, and transmitting uplink control information on a second frequency region of the system bandwidth during a second symbol of the TTI.

Transmitter 520 may transmit signals generated by other components of the device. In some examples, the transmitter 520 may be collocated with a receiver 510 in a transceiver module. For example, the transmitter 520 may be an example of aspects of the transceiver 635 described with reference to FIG. 6. The transmitter 520 may utilize a single antenna or a set of antennas.

Figure 6:
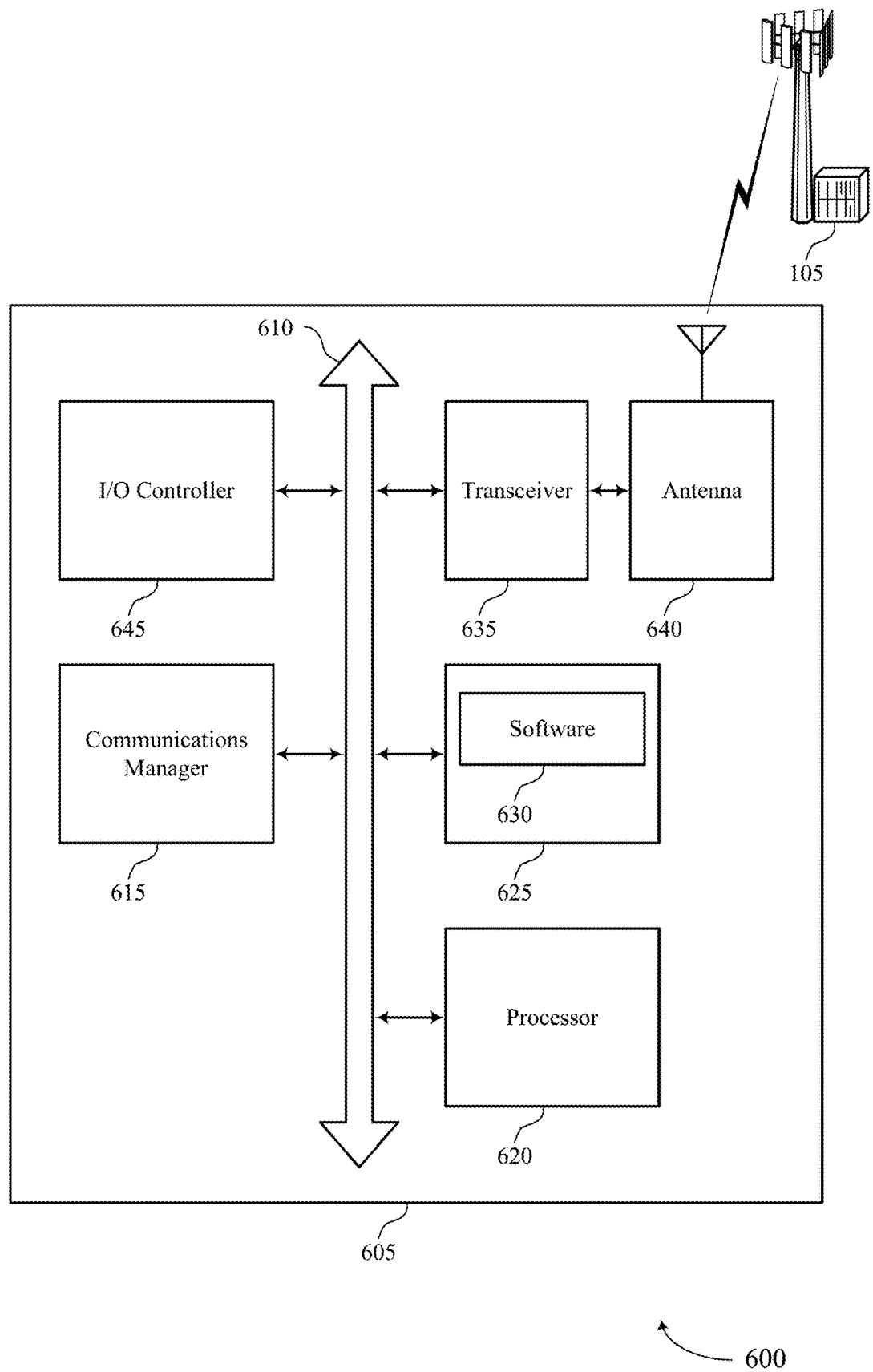
FIG. 6 illustrates a block diagram of a system including a user equipment (UE) in accordance with aspects of the present disclosure.

FIG. 6 shows a diagram of a system 600 including a device 605 in accordance with various aspects of the present disclosure. Device 605 may be an example of or include the components of wireless device 405, wireless device 505, or a UE 115 as described above, e.g., with reference to FIGS. 4 and 5. Device 605 may include components for bi-directional voice and data communications including components for transmitting and receiving communications, including communications manager 615, processor 620, memory 625, software 630, transceiver 635, antenna 640, and I/O controller 645. These components may be in electronic communication via one or more buses (e.g., bus 610). Device 605 may communicate wirelessly with one or more base stations 105.

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 620 may be configured to operate a memory array using a memory controller. In other aspects, a memory controller may be integrated into processor 620. Processor 620 may be configured to execute computer-readable instructions stored in a memory to perform various functions (e.g., functions or tasks supporting transmit power and frequency hopping configurations for control information transmissions).

Memory 625 may include random access memory (RAM) and read only memory (ROM). The memory 625 may store computer-readable, computer-executable software 630 including instructions that, when executed, cause the processor to perform various functions described herein. In some aspects, the memory 625 may contain, among other things, a basic input/output system (BIOS) which may control basic hardware or software operation such as the interaction with peripheral components or devices.

Software 630 may include code to implement aspects of the present disclosure, including code to support transmit power and frequency hopping configurations for control information transmissions. Software 630 may be stored in a non-transitory computer-readable medium such as system memory or other memory. In some aspects, the software 630 may not be directly executable by the processor but may cause a computer (e.g., when compiled and executed) to perform functions described herein.

Transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas.

In some aspects, the wireless device may include a single antenna 640. However, in some aspects the device may have more than one antenna 640, which may be capable of concurrently transmitting or receiving multiple wireless transmissions.

I/O controller 645 may manage input and output signals for device 605. I/O controller 645 may also manage peripherals not integrated into device 605. In some aspects, I/O controller 645 may represent a physical connection or port to an external peripheral. In some aspects, I/O controller 645 may utilize an operating system such as iOS®, ANDROID®, MS-DOS®, MS-WINDOWS®, OS/2®, UNIX®, LINUX®, or another known operating system. In other aspects, I/O controller 645 may represent or interact with a modem, a keyboard, a mouse, a touchscreen, or a similar device. In some aspects, I/O controller 645 may be implemented as part of a processor. In some aspects, a user may interact with device 605 via I/O controller 645 or via hardware components controlled by I/O controller 645.

Figure 7:
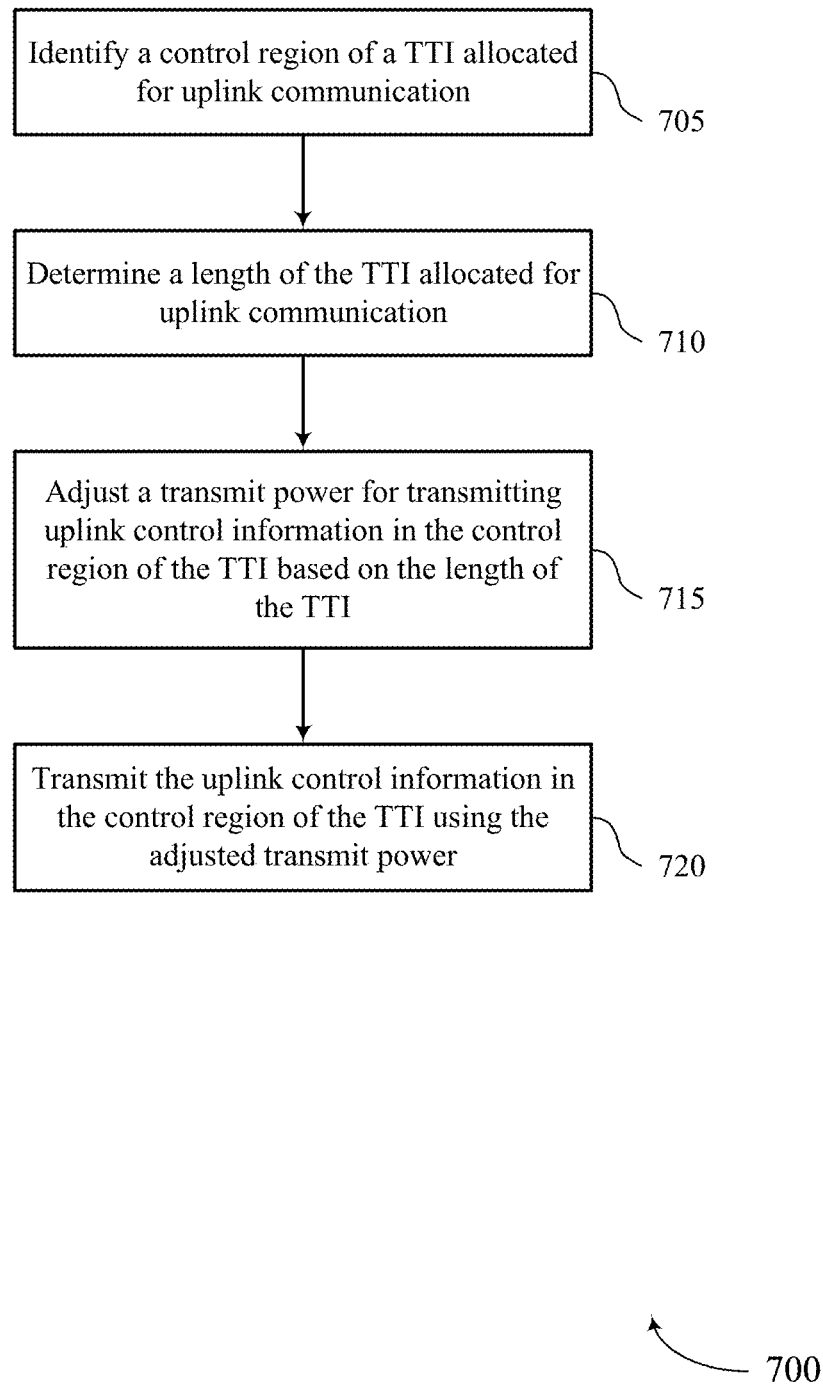
FIGS. 7-10 illustrate methods in accordance with aspects of the present disclosure.

FIG. 7 shows a flowchart illustrating a method 700 in accordance with various aspects of the present disclosure. The operations of method 700 may be implemented by a UE 115 or its components as described herein. For example, the operations of method 700 may be performed by a communications manager as described with reference to FIGS. 4 through 6. In some examples, a UE 115 may execute a set of codes to control the functional elements of the device to perform the functions described below. Additionally, the UE 115 may perform aspects of the functions described below using special-purpose hardware.

At block 705 the UE 115 may identify a control region of a TTI allocated for uplink communication. The operations of block 705 may be performed according to the methods described herein. In certain examples, aspects of the operations of block 705 may be performed by a control region identifier as described with reference to FIGS. 4 through 6.

At block 710 the UE 115 may determine a length of the TTI allocated for uplink communication. The operations of block 710 may be performed according to the methods described herein. In certain examples, aspects of the operations of block 710 may be performed by a TTI length determiner as described with reference to FIGS. 4 through 6.

At block 715 the UE 115 may adjust a transmit power for transmitting uplink control information in the control region of the TTI based at least in part on the length of the TTI. The operations of block 715 may be performed according to the methods described herein. In certain examples, aspects of the operations of block 715 may be performed by a transmit power manager as described with reference to FIGS. 4 through 6.

At block 720 the UE 115 may transmit the uplink control information in the control region of the TTI using the adjusted transmit power. The operations of block 720 may be performed according to the methods described herein. In certain examples, aspects of the operations of block 720 may be performed by a transmitter as described with reference to FIGS. 4 through 6.

Figure 8:
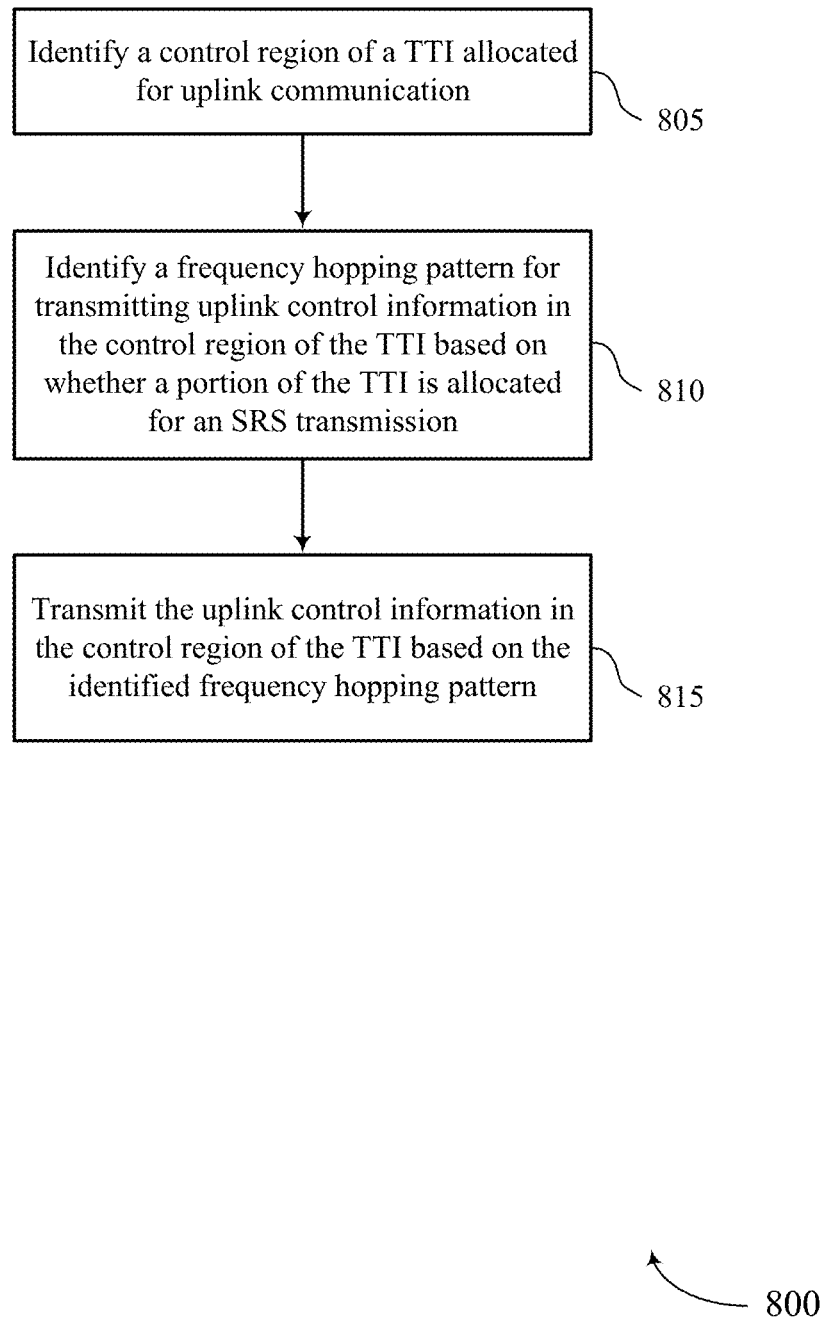

FIG. 8 shows a flowchart illustrating a method 800 in accordance with various aspects of the present disclosure. The operations of method 800 may be implemented by a UE 115 or its components as described herein. For example, the operations of method 800 may be performed by a communications manager as described with reference to FIGS. 4 through 6. In some examples, a UE 115 may execute a set of codes to control the functional elements of the device to perform the functions described below. Additionally, the UE 115 may perform aspects of the functions described below using special-purpose hardware.

At block 805 the UE 115 may identify a control region of a TTI allocated for uplink communication. The operations of block 805 may be performed according to the methods described herein. In certain examples, aspects of the operations of block 805 may be performed by a control region identifier as described with reference to FIGS. 4 through 6.

At block 810 the UE 115 may identify a frequency hopping pattern for transmitting uplink control information in the control region of the TTI based at least in part on whether a portion of the TTI is allocated for a SRS transmission. The operations of block 810 may be performed according to the methods described herein. In certain examples, aspects of the operations of block 810 may be performed by a frequency hopping manager as described with reference to FIGS. 4 through 6.

At block 815 the UE 115 may transmit the uplink control information in the control region of the TTI based at least in part on the identified frequency hopping pattern. The operations of block 815 may be performed according to the methods described herein. In certain examples, aspects of the operations of block 815 may be performed by a frequency hopping manager as described with reference to FIGS. 4 through 6.

Figure 9:
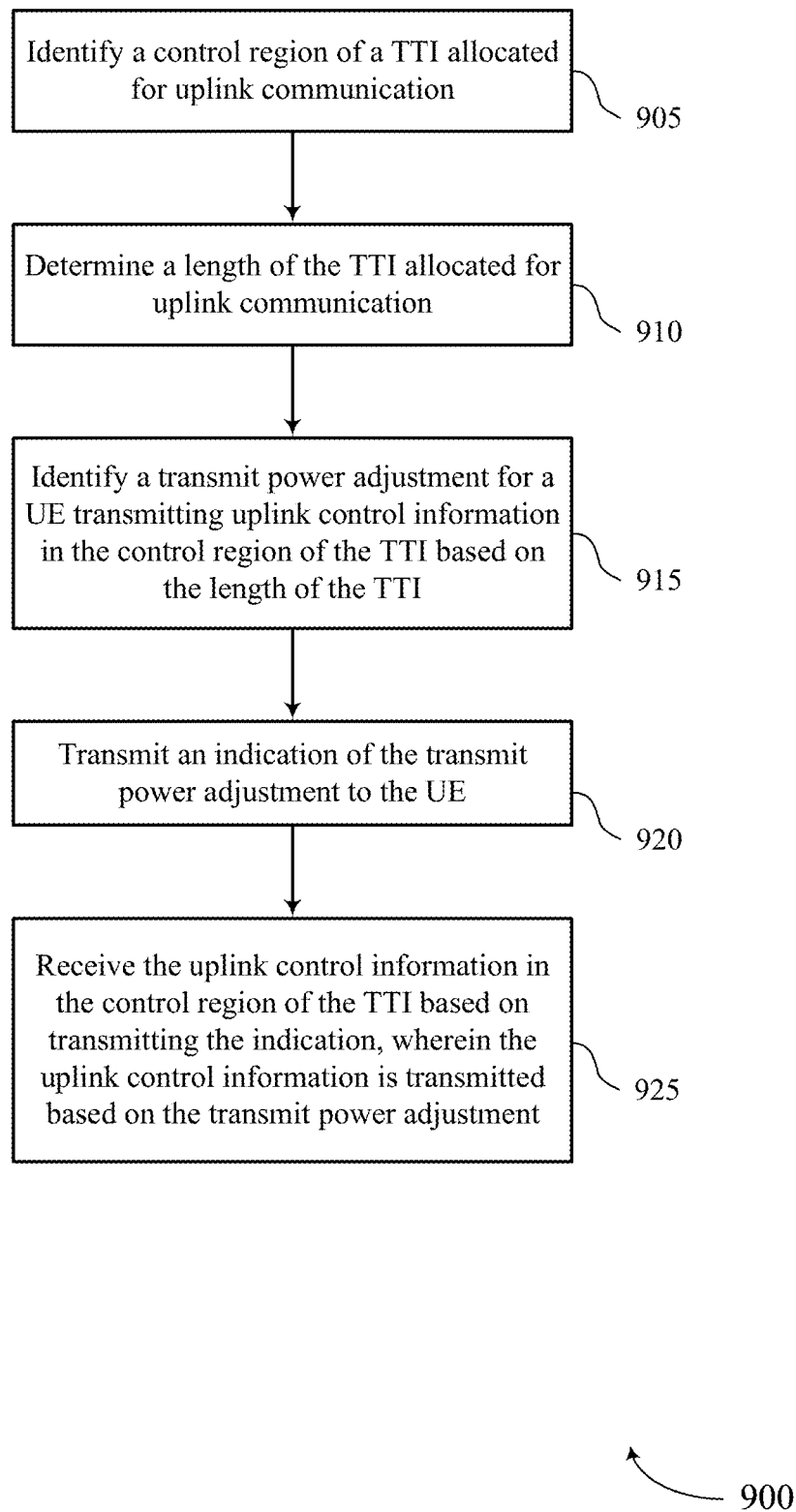

FIG. 9 shows a flowchart illustrating a method 900 in accordance with various aspects of the present disclosure. The operations of method 900 may be implemented by a base station 105 or its components as described herein. In some examples, a base station 105 may execute a set of codes to control the functional elements of the device to perform the functions described below. Additionally, the base station 105 may perform aspects of the functions described below using special-purpose hardware.

At block 905 the base station 105 may identify a control region of a TTI allocated for uplink communication. At block 910 the base station 105 may determine a length of the TTI allocated for uplink communication. At block 915 the base station 105 may identify a transmit power adjustment for a UE 115 transmitting uplink control information in the control region of the TTI based at least in part on the length of the TTI. At block 920 the base station 105 may transmit an indication of the transmit power adjustment to the UE 115. At block 925 the base station 105 may receive the uplink control information in the control region of the TTI based at least in part on transmitting the indication, where the uplink control information is transmitted based at least in part on the transmit power adjustment. The operations of blocks 905, 910, 915, 920, and 925 may be performed according to the methods described herein.

Figure 10:
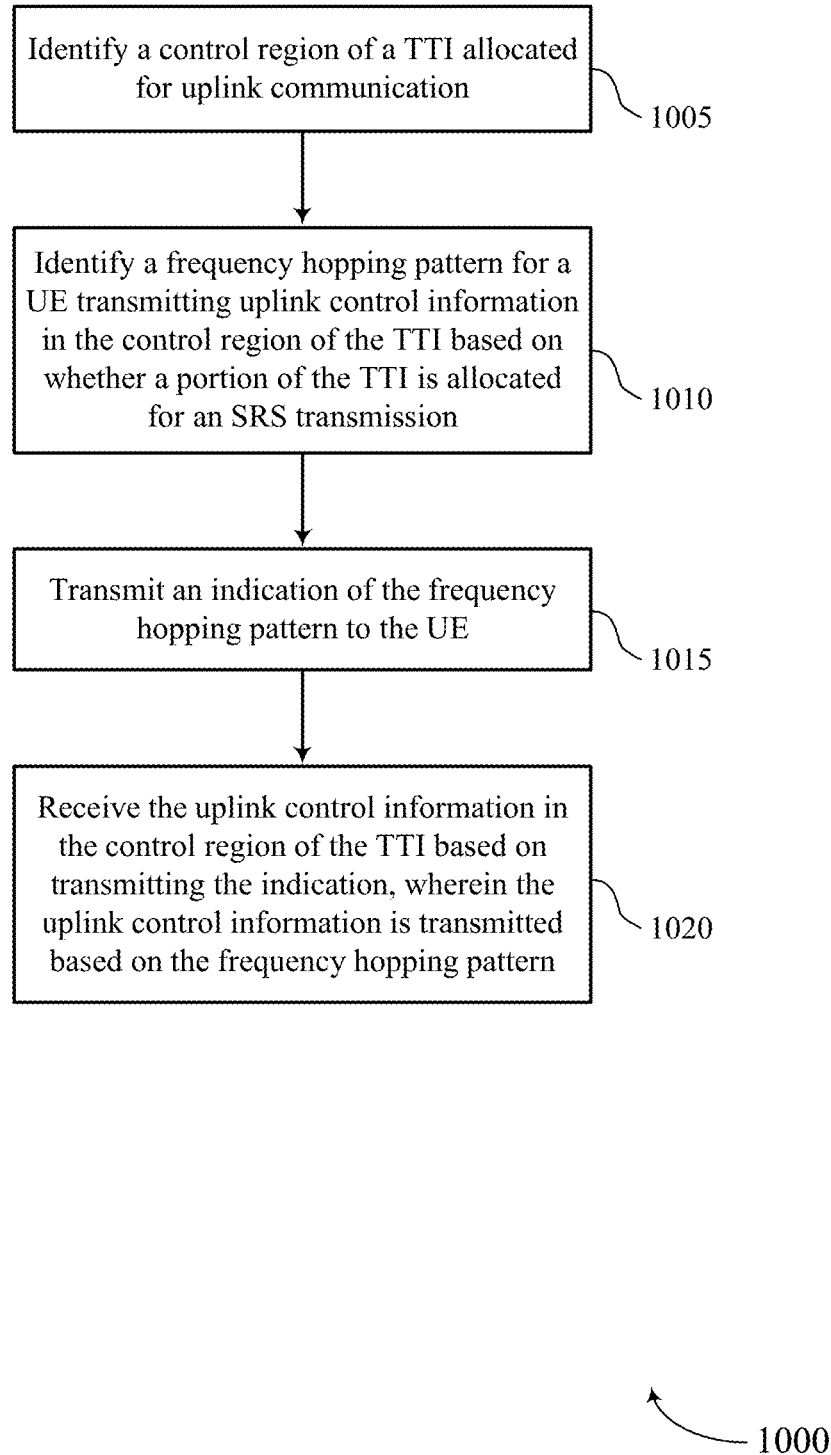

FIG. 10 shows a flowchart illustrating a method 1000 in accordance with various aspects of the present disclosure. The operations of method 1000 may be implemented by a base station 105 or its components as described herein. In some examples, a base station 105 may execute a set of codes to control the functional elements of the device to perform the functions described below. Additionally, the base station 105 may perform aspects of the functions described below using special-purpose hardware.

At block 1005 the base station 105 may identify a control region of a TTI allocated for uplink communication. At block 1010 the base station 105 may identify a frequency hopping pattern for a UE transmitting uplink control information in the control region of the TTI based at least in part on whether a portion of the TTI is allocated for an SRS transmission. At block 1015 the base station 105 may transmit an indication of the frequency hopping pattern to the UE. At block 1020 the base station 105 may receive the uplink control information in the control region of the TTI based at least in part on transmitting the indication, where the uplink control information is transmitted based at least in part on the frequency hopping pattern. The operations of blocks 1005, 1010, 1015, 1020, and 1025 may be performed according to the methods described herein.

It should be noted that the methods described above describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports multiple transmission time interval (TTI) lengths, comprising:
    identifying a control region of a TTI allocated for uplink communication;
    determining a length of the TTI allocated for uplink communication;
    determining that none of a plurality of symbols of the TTI are allocated for a sounding reference signal (SRS);
    adjusting a transmit power for transmitting uplink control information in the control region of the TTI based at least in part on none of the plurality of symbols of the TTI being allocated for the SRS and the length of the TTI such that a transmit power used in each symbol of the TTI is the same as a transmit power used in each symbol of another TTI having a different length; and
    transmitting the uplink control information in the control region of the TTI using the adjusted transmit power.

2. The method of claim 1, wherein adjusting the transmit power comprises:
    using a same transmit power for transmitting uplink control information during each symbol of the TTI.

3. The method of claim 1, wherein the TTI comprises three symbols.

4. The method of claim 3, wherein the adjusted transmit power comprises a same transmit power used for transmitting uplink control information during a TTI comprising two symbols.

5. The method of claim 3, further comprising:
    determining that one symbol of the TTI is allocated for an SRS transmission.

6. The method of claim 5, further comprising:
    using a first transmit power for transmitting the uplink control information during a first symbol of the TTI and using a second transmit power for transmitting the uplink control information during a second symbol of the TTI,
    wherein the first transmit power and the second transmit power are the same.

7. The method of claim 6, further comprising:
    receiving an indication of the same transmit power for transmitting uplink control information during each symbol of the TTI, wherein the first transmit power and the second transmit power are adjusted based at least in part on the indication.

8. The method of claim 7, wherein the indication comprises a power offset parameter.

9. The method of claim 3, further comprising:
    using a first transmit power for transmitting the uplink control information during a first symbol of the TTI, using a second transmit power for transmitting the uplink control information during a second symbol of the TTI, and using a third transmit power for transmitting the uplink control information during a third symbol of the TTI,
    wherein each of the first transmit power, the second transmit power, and the third transmit power comprises a fraction of the adjusted transmit power for transmitting the uplink control information during the TTI.

10. The method of claim 9, further comprising:
receiving an indication of the transmit power for transmitting uplink control information during each symbol of the TTI, wherein the first transmit power, the second transmit power, and the third transmit power are adjusted based at least in part on the indication.

11. The method of claim 10, wherein the indication comprises a power offset parameter.

12. The method of claim 1, wherein the control region spans one symbol of the TTI.

13. The method of claim 12, wherein the adjusted transmit power is a same transmit power used for transmitting uplink control information during each symbol of a TTI comprising two symbols.

14. The method of claim 12, wherein the adjusted transmit power is greater than a transmit power used for transmitting uplink control information during each symbol of a TTI comprising two symbols.

15. The method of claim 12, further comprising:
receiving an indication of the transmit power for transmitting uplink control information during the TTI, wherein the transmit power is adjusted based at least in part on the indication.

16. The method of claim 15, wherein the indication comprises a power offset parameter.

17. The method of claim 1, wherein the length of the TTI allocated for uplink communication is determined based at least in part on an index of the TTI or a type of service associated with the TTI.

18. A method for wireless communication, comprising:
identifying a control region of a transmission time interval (TTI) allocated for uplink communication;
identifying a frequency hopping pattern for transmitting uplink control information in the control region of the TTI based at least in part on a number of symbols in the TTI; and
transmitting the uplink control information in the control region of the TTI based at least in part on the identified frequency hopping pattern.

19. The method of claim 18, wherein one symbol of the TTI is allocated for a sounding reference signal (SRS) transmission and the TTI comprises three symbols.

20. The method of claim 18, wherein transmitting the uplink control information based at least in part on the identified frequency hopping pattern comprises:
transmitting uplink control information on a first frequency region of a system bandwidth during a first symbol in time of the TTI; and
transmitting uplink control information on a second frequency region of the system bandwidth during a second and third symbol in time of the TTI.

21. An apparatus for wireless communication in a system that supports multiple transmission time interval (TTI) lengths, comprising:
means for identifying a control region of a TTI allocated for uplink communication;
means for determining a length of the TTI allocated for uplink communication;
means for determining that none of a plurality of symbols of the TTI are allocated for a sounding reference signal (SRS);
means for adjusting a transmit power for transmitting uplink control information in the control region of the TTI based at least in part on none of the plurality of symbols of the TTI being allocated for the SRS and the length of the TTI such that a transmit power used in each symbol of the TTI is the same as a transmit power used in each symbol of another TTI having a different length; and
means for transmitting the uplink control information in the control region of the TTI using the adjusted transmit power.

22. An apparatus for wireless communication, comprising:
means for identifying a control region of a transmission time interval (TTI) allocated for uplink communication;
means for identifying a frequency hopping pattern for transmitting uplink control information in the control region of the TTI based at least in part on a number of symbols in the TTI; and
means for transmitting the uplink control information in the control region of the TTI based at least in part on the identified frequency hopping pattern.

23. An apparatus for wireless communication in a system that supports multiple transmission time interval (TTI) lengths, comprising:
a processor;
memory in electronic communication with the processor; and
instructions stored in the memory and operable, when executed by the processor, to cause the apparatus to:
identify a control region of a TTI allocated for uplink communication;
determine a length of the TTI allocated for uplink communication;
determine that none of a plurality of symbols of the TTI are allocated for a sounding reference signal (SRS);
adjust a transmit power for transmitting uplink control information in the control region of the TTI based at least in part on none of the plurality of symbols of the TTI being allocated for the SRS and the length of the TTI such that a transmit power used in each symbol of the TTI is the same as a transmit power used in each symbol of another TTI having a different length; and
transmit the uplink control information in the control region of the TTI using the adjusted transmit power.

24. The apparatus of claim 23, wherein the instructions are further executable by the processor to:
use a same transmit power for transmitting uplink control information during each symbol of the TTI.

25. The apparatus of claim 23, wherein the TTI comprises three symbols.

26. The apparatus of claim 25, wherein the adjusted transmit power comprises a same transmit power used for transmitting uplink control information during a TTI comprising two symbols.

27. The apparatus of claim 25, wherein the instructions are further executable by the processor to:
determine that one symbol of the TTI is allocated for an SRS transmission.

28. The apparatus of claim 27, wherein the instructions are further executable by the processor to:
use a first transmit power for transmitting the uplink control information during a first symbol of the TTI and using a second transmit power for transmitting the uplink control information during a second symbol of the TTI,
wherein the first transmit power and the second transmit power are the same.

29. The apparatus of claim 28, wherein the instructions are further executable by the processor to:
receive an indication of the transmit power for transmitting uplink control information during each symbol of the TTI, wherein the first transmit power and the second transmit power are adjusted based at least in part on the indication.

30. The apparatus of claim 29, wherein the indication comprises a power offset parameter.

31. The apparatus of claim 25, wherein the instructions are further executable by the processor to:
use a first transmit power for transmitting the uplink control information during a first symbol of the TTI, using a second transmit power for transmitting the uplink control information during a second symbol of the TTI, and using a third transmit power for transmitting the uplink control information during a third symbol of the TTI,
wherein each of the first transmit power, the second transmit power, and the third transmit power comprises a fraction of the adjusted transmit power for transmitting the uplink control information during the TTI.

32. The apparatus of claim 31, wherein the instructions are further executable by the processor to:
receive an indication of the transmit power for transmitting uplink control information during each symbol of the TTI, wherein the first transmit power, the second transmit power, and the third transmit power are adjusted based at least in part on the indication.

33. The apparatus of claim 32, wherein the indication comprises a power offset parameter.

34. The apparatus of claim 23, wherein the control region spans one symbol of the TTI.

35. The apparatus of claim 34, wherein the adjusted transmit power is a same transmit power used for transmitting uplink control information during each symbol of a TTI comprising two symbols.

36. The apparatus of claim 34, wherein the adjusted transmit power is greater than a transmit power used for transmitting uplink control information during each symbol of a TTI comprising two symbols.

37. The apparatus of claim 34, wherein the instructions are further executable by the processor to:
receive an indication of the transmit power for transmitting uplink control information during the TTI, wherein the transmit power is adjusted based at least in part on the indication.

38. The apparatus of claim 37, wherein the indication comprises a power offset parameter.

39. The apparatus of claim 23, wherein the length of the TTI allocated for uplink communication is determined based at least in part on an index of the TTI or a type of service associated with the TTI.

40. An apparatus for wireless communication, comprising:
a processor;
memory in electronic communication with the processor; and
instructions stored in the memory and operable, when executed by the processor, to cause the apparatus to:
identify a control region of a transmission time interval (TTI) allocated for uplink communication;
identify a frequency hopping pattern for transmitting uplink control information in the control region of the TTI based at least in part on a number of symbols in the TTI; and
transmit the uplink control information in the control region of the TTI based at least in part on the identified frequency hopping pattern.

41. The apparatus of claim 40, wherein one symbol of the TTI is allocated for a sounding reference signal (SRS) transmission and the TTI comprises three symbols.

42. The apparatus of claim 40, wherein the instructions are further executable by the processor to:
transmit uplink control information on a first frequency region of a system bandwidth during a first symbol in time of the TTI; and
transmit uplink control information on a second frequency region of the system bandwidth during a second and third symbol in time of the TTI.

43. A non-transitory computer readable medium storing code for wireless communication in a system that supports multiple transmission time interval (TTI) lengths, the code comprising instructions executable by a processor to:
identify a control region of a TTI allocated for uplink communication;
determine a length of the TTI allocated for uplink communication;
determine that none of a plurality of symbols of the TTI are allocated for a sounding reference signals (SRS);
adjust a transmit power for transmitting uplink control information in the control region of the TTI based at least in part on none of the plurality of symbols of the TTI being allocated for the SRS and the length of the TTI such that a transmit power used in each symbol of the TTI is the same as a transmit power used in each symbol of another TTI having a different length; and
transmit the uplink control information in the control region of the TTI using the adjusted transmit power.

44. A non-transitory computer readable medium storing code for wireless communication, the code comprising instructions executable by a processor to:
identify a control region of a transmission time interval (TTI) allocated for uplink communication;
identify a frequency hopping pattern for transmitting uplink control information in the control region of the TTI based at least in part on a number of symbols in the TTI; and
transmit the uplink control information in the control region of the TTI based at least in part on the identified frequency hopping pattern.

* * * * *